United States Patent [19]

Dodson et al.

[11] 4,210,457

[45] Jul. 1, 1980

[54] PORTLAND CEMENT-FLY ASH-AGGREGATE CONCRETES

[75] Inventors: Vance H. Dodson, Walpole; Lawrence R. Roberts, Acton, both of Mass.

[73] Assignee: W. R. Grace & Co., Cambridge, Mass.

[21] Appl. No.: 950,918

[22] Filed: Oct. 12, 1978

[51] Int. Cl.$^2$ .............................................. C04B 7/02
[52] U.S. Cl. ...................................... 106/97; 106/98; 106/DIG. 1
[58] Field of Search ...................... 106/97, 98, DIG. 1

[56] References Cited

U.S. PATENT DOCUMENTS

| | | | |
|---|---|---|---|
| 2,250,107 | 7/1941 | Nelles | 106/98 |
| 2,987,408 | 6/1961 | Minnick | 106/98 |
| 3,953,222 | 4/1976 | Bainton | 106/97 |
| 4,050,950 | 9/1977 | Brewer | 106/97 |

FOREIGN PATENT DOCUMENTS 2093334  1/1972  France .............................. 106/DIG. 1

*Primary Examiner*—James Poer
*Attorney, Agent, or Firm*—William L. Baker; C. Edward Parker

[57] ABSTRACT

Concretes containing Portland cement, fly ash and aggregate are disclosed which are capable of attaining high compressive strength and which contain relatively low proportions of Portland cement and relatively high proportions of a select fly ash component. The inventive concretes may be formulated as highly dense masses particularly suited for use in the manner of conventional structural concretes in buildings, bridges, dams, etc. Comparatively low density concrete masses may also be produced which are light in weight and have thermal insulation value rendering them particularly suited for use as thermal insulating components of roofs and as protective coatings for a variety of substrates.

32 Claims, No Drawings

PORTLAND CEMENT-FLY ASH-AGGREGATE CONCRETES

BACKGROUND OF THE INVENTION

This invention relates to cementitious compositions containing Portland cement and fly ash. More particularly, this application concerns novel Portland cement concrete compositions containing relatively low proportions of cement together with relatively high proportions of a select fly ash component, which compositions when mixed with water and allowed to set harden into masses exhibiting unexpectedly high compressive strengths.

Of all the hydraulic cements, Portland cement enjoys the most widespread use for constructional purposes at the present time. Portland cement is produced by heating to fusion mixtures of argillaceous and calcareous materials and thereafter grinding the "clinker" produced, in the presence of up to about five percent gypsum, to a fine powder. Mixtures of Portland cement with a particulate aggregate such as limestone and sand form a "structural" concrete which is unsurpassed as a strong and durable building material.

Fly ash is a well known material generated as a by-product in the combustion of coal as a fuel in power plant boilers. The American Concrete Institute Publication "SP-19" defines fly ash as "The finely divided residue resulting from the combustion of ground or powdered coal and which is transported from the firebox through the boiler by flue gas". The recent growth of coal fired power due to fuel oil shortage and price increases has resulted in an abundance of fly ash with consequent active promotion of uses for the rapidly accumulating solid waste material.

Being finely divided and highly siliceous, fly ash is a well known pozzolan which forms a slowly hardening cement with water and hydrated lime. A pozzolan is defined in the American Concrete Institute Publication "SP-19" as "A siliceous or siliceous and aluminous material, which in itself possesses little or no cementitious value but will, in finely divided form and in the presence of moisture, chemically react with calcium hydroxide at ordinary temperatures to form compounds possessing cementitious properties". This chemical reaction between the pozzolan and the calcium hydroxide is often referred to as the "pozzolanic reaction". While the "pozzolanic reaction" has been studied, the mechanisms involved are not completely understood. For instance in a report published in June, 1976 by the U.S. Department of Transportation, No. FHWA-IP-76-16 entitled "FLY ASH AS A CONSTRUCTION MATERIAL FOR HIGHWAYS", it is stated that the pozzolanic reaction, although still not completely understood, involves the silica and alumina compounds in the fly ash, as well as any free lime which may be present.

The art has recognized that useful cementitious compositions can be prepared by combining in the presence of water Portland cement and pozzolans such as fly ash. For example, as detailed in the aforementioned published report of the Department of Transportation (DOT), Portland cement may be added to lime-fly ash-aggregate base and sub-base courses in rigid pavement systems as a substitute for all or part of the lime to accelerate the rate of strength gain of the mixtures. On the other hand it is well known to add fly ash and other pozzolans to Portland cement compositions. Commercial Portland cements containing appreciable amounts, 15 to 40 percent, of pozzolan such as fly ash are known in the art as "Type 1P" cements. Moreover, Portland cement concretes have been prepared containing fly ash to increase workability and pumpability, to control bleeding, reduce shrinkage, etc. The major objective however sought by the addition of fly ash to Portland cement concretes in the U. S. has been for the enhancement of compressive strength of the hardened concrete. In such concretes the fly ash has been added as a replacement for the cement and/or sand, the pozzolanic fly ash reacting with the lime produced as the result of the hydration reaction between the Portland cement component and water to give additional strength. Such "pozzolanic reaction" of the fly ash increases the strength of the concrete, especially at ages of 28 days or more. The cementitious compounds produced by the "pozzolanic reaction" are believed to fill the pores and capillaries that are normally present in concrete and as a result the concrete containing fly ash also becomes less permeable to water and salt solutions.

The amount of fly ash in practice added to Portland cement concrete has varied depending upon the desired end properties of the concrete. Generally, when a given Portland cement concrete is redesigned to include fly ash, between 10 and 30% of the Portland cement, by weight, is replaced by a volume of fly ash which ranges from that equal to that of the cement removed to that equal to two times that of the cement removed. One-hundred pounds of a typical Type I Portland cement will produce enough calcium hydroxide during its reaction with water to react with about 20 pounds of a typical fly ash. The amount of fly ash, therefore, over and above this 100 cement to 20 fly ash weight ratio acts essentially in a physical way to affect bleeding, workability and heat of hydration. When the amount of fly ash used in concrete is equal in volume to the amount removed and the cement substitution exceeds about 20%, the compressive strengths of the set concrete are lower as compared to a reference non-fly ash-containing concrete, at all ages, and for this reason substitution beyond the approximate 20% level in concrete has been avoided in practice.

Concretes however wherein fly ash has been substituted beyond the 20% level have been suggested in the art. For example, in U. S. Pat. No. 2,250,107 to John S. Nelles, assigned to the Detroit Edison Company, Detroit, Michigan, Portland cement concretes are described wherein fly ash is added in substitution for part or all of the fine aggregate such as sand conventionally used as the fine aggregate. The fly ash is said to be added in greater proportions than previously added, i.e., at least equal to the amount of cement by volume, with a range of from 1.5 to 2.5 times the amount of cement being preferred. The resulting concretes are said to be stronger than comparable concretes having identical Portland cement content, to be lighter in weight, and to possess better workability and flexibility. Also, in British Patent No. 940,692 to Fonbonne, Portland cement compositions comprised of mixtures of cement and fly ash are described, the proportion of fly ash constituting at least two thirds by weight of the cement. In contrast to prior art cement-fly ash compositions wherein the proportion of fly ash was limited, the hardened compositions of British 940,692 containing the large amounts of fly ash are said to have good compressive strengths after 7 and 28 days. According to the British patent, the prior art cement-fly ash compositions limited the amount of fly ash to 20 percent by weight, since it was found that increased proportions beyond this decreased the strength of the hardened cement. The high fly ash content cement compositions of British Pat. No. 940,692 are said to increase in strength at a greater rate than conventional cements having similar strength at 28 days after setting. According to the British patent it was found necessary to crush the fly ash as uncrushed ash would not produce an effective cement composition.

It is also known in the art that the chemical compositions of fly ashes from coals from differing geographical locations sometimes vary significantly as does their pozzolanic activity. According to the aforementioned DOT report No. FHWA-IP-76-16, the extent and rate of pozzolanic reaction involving fly ashes is a function of several factors including quantity of stabilizer (free lime or cement), total silica and alumina in the fly ash, etc. The DOT report also states that fly ashes having large amounts of free lime (as indicated by, although not equal to, the CaO content) tend to be very reactive and probably exhibit some degree of self-hardening. The report describes compositions stabilized through the pozzolanic reaction by the addition thereto of lime and/or cement, and/or aggregate, particularly useful in constructing pavements, stabilizing soil, embankments, structural backfill, and in forming grouting compositions.

In U. S. Pat. No. 3,634,115 to Leonard John Minnick, a new fly ash is described which is "sulfopozzolanically" reactive. The fly ash is said inter alia to have a high sulfate and a high calcium oxide content rendering it useful for preparing stabilized load-supporting compositions having superior qualities. The new fly ash is produced by injecting lime into the boiler under particular conditions during combustion of the coal. The novel fly ash according to the patent gives especially good results when combined with lime and aggregate, for example, to provide a sub-base or sub-roadway course, although other materials such as Portland cement and ordinary fly ash can be used with the inventive fly ash according to the patent.

SUMMARY OF THE INVENTION

It has been found that certain fly ashes when combined with Portland cement in weight ratios of 1 part cement to 1, preferably about 1.5 parts fly ash up to weight ratios of 1 part cement to about 15 parts fly ash produce surprisingly high strengths in concrete, mortar and pastes which it is believed, cannot be entirely accounted for by the conventional "pozzolanic reaction". The fly ashes combined with Portland cement in these relatively high ratios to produce unexpectedly high strength mixtures according to the invention are those characterized as having a total analyzable calcium oxide greater than about 10, preferably greater than about 15, percent by weight and a combined silica ($SiO_2$), alumina ($Al_2O_3$), and iron oxide ($Fe_2O_3$) content of less than about 80, preferably less than about 75, percent by weight. Particularly valuable are high density mixtures of such cement/fly ash combinations with aggregate such as sand and/or stone to produce structural concretes where strength is most important. These "structural" concretes according to the invention exhibit high strength when measured at early as well as later stages of hydration with minimum cement content. A practical result of the invention is the ability to formulate high strength structural Portland cement concrete mixes containing less Portland cement than conventional Portland cement structural concrete mixtures.

The aforementioned discovery has also led to the preparation according to the invention of comparatively low density mixtures of such cement/fly ash combinations with lightweight aggregates, such as expanded vermiculite and perlite, and additionally air-entraining or foaming agents, which are valuable as lightweight thermal insulating masses in for example, roofs and roof decks, or as protective insulating coatings for a variety of substrates. Again, a lessening of the amount of Portland cement binder required in the mixture is afforded.

The "structural" concretes prepared herein may be characterized as "heavy", that is having a hardened density of at least about 120 pounds per cubic foot (p.c.f.), or "lightweight" in which case the hardened density ranges from about 70 to about 120 p.c.f. The aggregates moreover in such structural concretes may be "heavy", that is possess densities of at least about 80 p.c.f. or may be characterized as "lightweight" in which case their densities range between about 40 and 80 p.c.f. Low density "insulating" concretes prepared herein on the other hand generally have hardened densities less than about 70, typically less than about 60, p.c.f. and employ aggregates having a density less than about 15 p.c.f.

The fly ashes employed herein in high proportion to produce such valuable products are characterized as possessing a particular chemical composition defined below. In addition, the fly ashes used herein appear to be unique in their behavior in various tests described below. Moreover the fly ashes used herein are products of commerce being produced at various boiler facilities, and need not be first crushed or ground to promote activity.

DETAILED DESCRIPTION OF THE INVENTION

In investigations leading to the finding upon which the present invention is based, fly ashes from various sources throughout the United States were obtained and mixed with Portland cement, particularly with Portland cement-aggregate blends to form dry concrete mixes, and thereafter water added to hydrate the mixtures. The fly ashes were obtained from principally power companies operating in the States of Illinois, Pennsylvania, Minnesota, North Dakota, Michigan, Texas, Kansas, Ohio, Florida and Arizona. Because of the wide differences in coal sources and coal firing practices in the industry, the physical properties and chemical compositions of the fly ashes varied markedly. TABLE I below details the typical chemical analyses of fly ashes from sources A through K. TABLE I gives the appropriate percent by weight of $SiO_2$; $Al_2O_3$; and $Fe_2O_3$; combined $SiO_2$, $Al_2O_3$ and $Fe_2O_3$; CaO; MgO; and $SO_3$ found as well as the loss on ignition (L.O.I.) for each of the fly ash samples A through K, as calculated according to ASTM C114-77. Also shown in Table I is the percentage of "free lime" as calculated according to ASTM C-25 Section 28.3 (1972).

TABLE I

| SOURCE | A | B | C | D | E | F | G | H | I | J | K |
|---|---|---|---|---|---|---|---|---|---|---|---|
| Chemical Components | | | | | | | | | | | |
| % $SiO_2$ | 31.4 | 43.1 | 37.6 | 24.1 | 39.8 | 48.9 | 52.2 | 47.1 | 43.3 | 47.6 | 56.5 |
| $Al_2O_3$ | 19.7 | 21.8 | 27.5 | 14.3 | 16.8 | 29.6 | 31.0 | 20.8 | 18.5 | 23.3 | 24.7 |
| $Fe_2O_3$ | 6.6 | 4.2 | 7.3 | 9.5 | 6.8 | 9.3 | 8.3 | 16.0 | 29.9 | 16.0 | 5.6 |
| CaO | 20.2 | 23.5 | 17.9 | 29.6 | 16.8 | 6.2 | 4.9 | 5.0 | 4.3 | 7.6 | 7.7 |
| MgO | 3.9 | 3.8 | 3.7 | 8.5 | 5.3 | 0.7 | 0.7 | 1.8 | 0.9 | 1.4 | 2.0 |
| $SO_3$ | 6.4 | 1.6 | 5.7 | 5.9 | 2.8 | 0.6 | 0.3 | 0.6 | 1.2 | 0.7 | 0.5 |
| Loss on Ignition | 1.4 | 0.5 | 0.5 | 0.6 | 0.3 | 2.3 | 4.2 | 2.8 | 1.2 | 0.6 | 1.2 |
| $SiO_2 + Al_2O_3 + Fe_2O_3$ | 57.7 | 69.1 | 72.4 | 47.9 | 63.4 | 87.8 | 91.5 | 83.9 | 91.7 | 86.9 | 1.8 |
| Free Lime | 1.35 | 1.91 | 0.93 | 3.63 | 0.83 | 0.44 | 0.0 | 0.63 | 0.54 | 0.13 | 1.45 |

The fly ashes from the differing sources A through E not only varied in composition, but also, it was discovered, in their performance as ingredients in the aforementioned Portland cement mixtures. In particular, it was discovered that the long term compressive strengths of Portland cement-fly ash compositions such as concrete mixes, formulated with the fly ashes A-E in weight proportions of cement to fly ash greater than 1 to about 1, preferably greater than 1 to about 1.5, were markedly higher than identical cementitious compositions prepared using fly ashes from sources F through K. This marked difference in strength performance between the fly ashes at the relatively high addition ratios of fly ash was surprising since such difference was not in evidence from previous strength measurements involving Portland cement-fly ash compositions wherein the cement to fly ash ratio is less than 1 to 1. The marked difference in strength contribution of the fly ashes A-E at the higher ratios was further unexpected since it could not have been predicted by a stoichiometric calculation based upon the conventionally theorized "pozzolanic reaction". The fly ashes A-E had compositions falling in the approximate general ranges shown in Table II.

TABLE II

| Component | Approximate Composition Range - Wt.% |
|---|---|
| $SiO_2$ | 24.1–43.1 |
| $Al_2O_3$ | 14.3–27.5 |
| $Fe_2O_3$ | 4.2–9.5 |
| $SiO_2 + Al_2O_3 + Fe_2O_3$ | 47.9–72.4 |
| CaO | 16.8–29.6 |
| MgO | 3.7–8.5 |
| $SO_3$ | 1.6–6.4 |

In addition to the aforementioned compositional differences it was found that the strength-imparting fly ashes A-E differed from F-K in their response to various chemical treatments. These treatments are outlined as follows:

1. Reaction with tartaric acid

In this test, approximately 20 grams of fly ash are placed in a 250 ml. glass beaker containing 150 ml. of a 5% tartaric acid solution. The mixture is slowly brought to a boil and allowed to boil gently with constant stirring for 15 minutes. The beaker is then covered and its contents allowed to cool, unmolested, for about 3 hours. This procedure converts a fly ash from the A-E group to a voluminous gel whose height in the beaker will exceed 20 mm. Fly ashes F-K will settle to the bottom of the beaker and form a layer whose height is only 6 to 7 mm.

2. Reaction with triethanolamine

In this test, approximately 10 grams of fly ash are vigorously mixed with 50 ml. of a 10% triethanolamine solution in a stoppered bottle. After standing overnight, a 10 ml. portion of the clear, water white supernatant liquid is transferred (by pipet) to a second bottle which contains 10 ml. of a 10% hydrochloric acid solution. The triethanolamine/acid mixture involving a fly ash A-E will immediately develop a distinct canary yellow color. When this procedure is carried out with a fly ash F-K, the triethanolamine/acid mixture will remain colorless or take on only a very pale yellow color.

3. Reaction with Portland cement and water

The appearance of a hardened fly ash/Portland cement/water paste also distinguishes between the fly ash groups. The test procedure involves mixing, with a spoon or spatula, 20 grams of Portland cement, 50 grams of fly ash and sufficient water to produce a stiff paste in a cup or beaker. The paste is then rolled into a ball in the palms of the hands and allowed to harden in the laboratory atmosphere. After standing for a period of 5 to 6 hours, the paste formed from a fly ash A-E will begin to exhibit efflorescense and in 12 to 18 hours the test specimen will take on the appearance of a white "snow-ball". The paste made from a fly ash F-K will exhibit slight or no efflorescence under these test condition.

4. Heat of solution in an acid medium

This test involves treating 3 grams of fly ash with a mixture of 2 N nitric acid and hydrofluoric acid in accordance with the method described in ASTM C186, Section 4.2 and 5.3. The treatment is carried out in an adiabatic calorimeter and the heat produced by the dissolving fly ash is measured in calories per gram. The heat of the solution of each of the five fly ashes A-E described in TABLE III is listed in TABLE III.

TABLE III

| Fly Ash | Heat of Solution Cal./gram |
|---|---|
| A | 459.6 |
| B | 498.6 |
| C | 467.0 |
| D | 421.8 |
| E | 506.6 |

The remaining fly ashes from Table II have heat of solution values that are less than about 405 calories per gram.

While useful pastes and mortar compositions can be produced from Portland cement mixtures containing high proportions of the particular fly ashes of the invention, the present discovery, as aforementioned, is especially useful in preparing high strength concrete formulations for structural useage where high compressive strength is desired.

As is well known in the art, conventional structural concretes are mixtures essentially of Portland cement, coarse and fine aggregate and water. Such concretes use only sufficient water to make the mix placeable and when hardened have densities greater than 70 pounds per cubic foot and compressive strength values typically in excess of 2,000 psi after 28 days of preparation. "Coarse" aggregate conventionally are greater than about ⅜ inches in size, and include gravel, granite, limestone, shale, etc. The "fine" aggregate employed in Portland cement concretes is most often sand (silica), sometimes washed, comprised of particles less than about ⅜ inch, typically less than 3/16 of an inch in size. The total aggregate present in the set concrete is usually greater than 50 percent by volume. As aforementioned, aggregate used in dense structural concretes typically have bulk densities greater than about 80, more often greater than about 90, pounds per cubic foot.

As aforementioned, the inventive Portland cement/fly ash combinations are also useful in preparing lightweight, low density, thermal-insulating concretes. As opposed to structural concretes discussed above, such concretes have densities much less than about 100 pounds per cubic foot "dry", that is after hardening, and typically less than about 70 pounds per cubic foot. Such concretes are rendered lightweight and porous by the substitution of lightweight, low-density aggregates for the heavier sand and stone aggregate used in "structural" concretes, and/or by the incorporation of foaming or air-entraining agents which cause air or gas bubbles to be formed in the wet mixtures which render the concretes porous upon hardening. Structural concretes sometimes have air entrained therein also, but only to the extent of about 6 percent which is substantially less than the amount of air in thermal insulating concretes. Typical lightweight aggregates are those having dry densities of less than about 15, preferably less than about 10, pounds per cubic foot. Exemplary lightweight aggregates include those aggregates having cells or pores therein such as expanded vermiculite, expanded perlite, cellular synthetic resin particles, e.g. foamed polystyrene beads or shreds, cellular glass beads, etc., or mixtures thereof. The amount of such aggregate used will depend upon, inter alia, the final density of the concrete desired, but typically at least 50% by volume of the hydrated composition is employed.

Suitable foaming or air entraining agents include surface active agents which act to entrain air in the composition as it is mixed with water and allowed to set, or as it is mixed, pumped and sprayed. The entrained air not only lowers density but also assists the pumpability and sprayability of the wet mixes. Any of the surface active agents heretofore found useful in the art for this purpose in low density cementitious compositions are useful herein. In general, the surface active sulfonates have found particular utilization by the art. Alpha olefin sulfonates as disclosed in U.S. Pat. No. 3,926,650 are preferred surface active foaming agents for use herein along with saponified or neutralized Vinsol resin. Vinsol resin is an extract of pinewood and a well known product of commerce. For use as a surface active agent the resin is neutralized typically with caustic alkali such as caustic soda. Another commercially popular surface active foaming agent for low density cementitious insulating compositions is sodium lauryl sulfate. A further illustrative surfactant is "TRITON X-100", a condensate of octylphenol and ethylene oxide produced by Rohm & Haas Co. A sufficient amount of the surface active agent is employed herein to give the desired low density and/or degree of pumpability and sprayability. In general an amount of surfactant ranging from about 0.001 to about 2, preferably 0.001 to 0.5, percent by weight of the total solids of the composition is employed.

In order to maintain the air which is entrained during mixing, particularly after pumping the wet air-entrained mixture, and in order to keep the lightweight aggregate in suspension and thus prevent segregation of the wet mix during pumping especially, a stabilizer such as a cellulose ether, starch or gum may be employed in the composition of the invention. Suitable cellulose ethers include methyl cellulose, hydroxethyl cellulose, methyl hydroxyethyl cellulose, hydroxypropyl methylcellulose and sodium carboxymethylcellulose. Illustrative stabilizing starches include for example hydrated corn starch and pregelantinized starch, while exemplary gums include natural gums such as guar gum, karaya gum and xanthum gum. Only a small amount, about 0.001 to 1.5, preferably 0.001 to about 0.5, percent by weight based on the total solids, of such stabilizer is typically needed.

Practical uses of the low density cement/fly ash concretes include use as insulating and fireproofing masses which may be pumped and thereafter poured or spray-applied. In the use for example of such lightweight concretes as a lightweight insulating layer in roof decks of commercial buildings, the material typically is mixed at ground level and thereafter pumped vertically to the roof deck. After placement in this fashion, the compositions after hydration must exhibit the desired low dry density, typically in the ranges of about 20 to 40 pounds per cubic foot. In simialar fashion, low density compositions for fireproofing for example steel structural beams of buildings are mixed, pumped and thereafter sprayed onto the exposed beams. Typical dry densities of hydrated cement/lightweight aggregate fireproofings applied in this manner lie in the range of about 10 to about 25 pounds per cubic foot.

In the detailed Examples 1-16 below, concrete formulations were prepared except where otherwise noted such as Example 9 (mortar) and 10 (paste). Where indicated, compressive strengths of the set concretes were tested according to ASTM No. C192 procedure. Usually the compressive strengths of specimens were measured after 1, 7 and 28 days, in accordance with ASTM No. C39. The concretes contained Portland cement or a mixture of Portland cement and fly ash in the proportions shown usually pounds per cubic yards of concrete produced. In all "concrete" formulations of Examples 1-16, a mixture of sand and crushed limestone was employed as the aggregate in a 45:45 ratio by weight unless otherwise noted. In the concrete mixes containing fly ash, the volume of sand and stone aggregate was reduced by an amount equal to the volume of fly ash added in order to maintain a constant yield. The Portland cement "X", "Y" and "Z" employed in certain of the Examples had the chemical compositions shown in Table IV below. The structural concretes were prepared in accordance with ASTM C494 procedure. Determination of the amount of air entrained in the hydrated compositions of the Examples below was made according to ASTM test procedure No. C231. Also, the "slump" of the wet mixes produced in the Examples was determined according to ASTM test procedure No.

C143. "Slump" is a measure of the relative consistency or plasticity of the wet mix.

TABLE IV

| Portland Cement Composition | X | Y | Z |
|---|---|---|---|
| % $SiO_2$ | 21.9 | 19.9 | 20.5 |
| $Al_2O_3$ | 4.9 | 5.7 | 5.2 |
| $Fe_2O_3$ | 2.7 | 2.6 | 2.5 |
| CaO | 66.0 | 62.3 | 62.3 |
| MgO | 1.2 | 3.1 | 3.6 |
| $SO_3$ | 2.1 | 2.8 | 3.4 |
| Loss on Ignition | 1.2 | 2.4 | 1.2 |
| Alk. as $Na_2O$ | 0.19 | 0.62 | 0.63 |
| $C_3S$ | 59.5 | 52.5 | 49.0 |
| $C_2S$ | 17.9 | 17.5 | 21.0 |
| $C_3A$ | 8.4 | 10.6 | 9.0 |
| $C_4AF$ | 8.2 | 8.0 | 7.0 |

The following Examples serve to illustrate the invention further and should not be construed as limiting the invention in any manner.

EXAMPLE I

To illustrate the effect of increasing the weight ratio of fly ash to cement on the compressive strength of concrete, a series of concretes were fabricated in which the weight ratio of cement to fly ash ranged from 1:0.0 to 1:2.5. The test data are summarized in Table V. The cement "X" was employed in the mixes. The fly ash used was "B" from Table I. Concretes No.'s 1,2,3 and 4 were included in the series for reference purposes and contain no fly ash. Concretes No. 5 and 6 have approximately the same cementitious volume (volume of cement and fly ash) as No. 4 and exhibit a strength decrease in going from a cement to fly ash ratio of 1:0.0, in No. 4 to 1:0.5 in No. 6. Concrete No. 7 has a cementitious volume approximately the same as No. 3 and increasing the cement to fly ash weight ratio from 1:0.0 to 1:1.0 causes a decrease in compressive strength at all ages of test. Concretes No. 2 and 3 have about the same cementitious volume and increasing the cement to fly ash ratio from 1:0.0 to 1:1.5 results in a decrease to compressive strength at all ages of test. Concretes No. 1 and 9 have about the same cementitious volume but increasing the cement to fly ash ratio from 1:0.0 to 1:2.0 results in an increase in 56 and 90 day strengths and only a moderate decrease in the 1,7 and 28 day strengths. Concrete No. 10, which has a slightly larger cementitious volume than No. 1 and has a cement to fly ash weight ratio of 1:2.5, has compressive strengths that exceed those of No. 1 at all ages except 1 day. If one ignores the influence of cementitious volume, the data clearly indicates that at a fixed cement content (i.e., 194 to 198 lbs./$yd^3$) an increase in fly ash content from 99 lbs/$yd^3$ in No. 6 to 485 lbs./$yd^3$ in No. 10 causes an unexpected increase in strength and the magnitude of the increase, at all ages of test, is very significant when the cement to fly ash weight ratio exceeds 1:1.0. The increase in strength caused by the added increments of fly ash is not likely due to an increase in the normal "pozzolanic reaction". The amount of cement in the concretes No. 6 through 10 will produce only enough calcium hydroxide to react with about 40 pounds of the fly ash. Therefore it might be concluded that the fly ash, because of its specified composition, is undergoing some kind of unique reaction which occurs when a fly ash of the invention is used with a minimum of Portland cement.

TABLE V

| Concrete No. | Cement (X) lbs/$yd^3$ | Fly Ash (B) lbs/$yd^3$ | Ratio Cement: Fly Ash-by wt. | w/c | Slump in. | Air % | Compressive Strength - P.S.I. | | | | |
|---|---|---|---|---|---|---|---|---|---|---|---|
| | | | | | | | 1-Day | 7-Day | 28-Day | 56-Day | 90-Day |
| 1 | 612 | — | 1:0.0 | 0.500 | 3¼ | 2.3 | 1163 | 3963 | 5499 | 6288 | 7226 |
| 2 | 505 | — | 1:0.0 | 0.600 | 3¼ | 2.1 | 910 | 3166 | 4706 | 5204 | 6034 |
| 3 | 404 | — | 1:0.0 | 0.750 | 2¾ | 1.9 | 519 | 1980 | 3181 | 3905 | 4457 |
| 4 | 303 | — | 1:0.0 | 1.040 | 2¼ | 2.0 | 218 | 940 | 1463 | 1786 | 1956 |
| 5 | 240 | 48 | 1:0.2 | 1.313 | 2¼ | 1.9 | 192 | 779 | 1222 | 1541 | 1793 |
| 6 | 198 | 99 | 1:0.5 | 1.501 | 2¼ | 1.2 | 168 | 738 | 1145 | 1493 | 1615 |
| 7 | 198 | 198 | 1:1.0 | 1.455 | 5 | 0.9 | 271 | 1257 | 1945 | 2841 | 3275 |
| 8 | 194 | 291 | 1:1.5 | 1.347 | 6¼ | 0.9 | 441 | 2094 | 3282 | 4590 | 5827 |
| 9 | 194 | 388 | 1:2.0 | 1.102 | 2¾ | 2.1 | 855 | 3460 | 5361 | 6964 | 7394 |
| 10 | 194 | 485 | 1:2.5 | 1.133 | 2¾ | 2.1 | 1007 | 3974 | 6205 | 7082 | 7945 |

EXAMPLE 2

The experiment described in Example 1 was repeated in part, using another fly ash that falls within the scope of this invention, "A", in combination with two different cements. The test data are summarized in Table VI. At a fixed cement content (i.e. 202 to 213 lbs./$yd^3$ in Concretes No. 11 through No. 17) the added increments of fly ash A to cement X result in unusually large increases in compressive strength, at all ages of test, especially when the cement to fly ash weight ratio exceeds 1:1.0. The same observation is true for the combinations of cement Y and fly ash A in Concretes No. 19 through 23.

TABLE VI

| Concrete No. | Cement Source | Cement Lbs/$yd^3$ | Fly Ash (A) lbs/$yd^3$ | Ratio Cement:Fly Ash-by Wt. | w/c | Slump In. | Air % | Compressive strength - P.S.I. | | | | |
|---|---|---|---|---|---|---|---|---|---|---|---|---|
| | | | | | | | | 1-Day | 7-Day | 28-Day | 56-Day | 90-Day |
| 11 | X | 202 | — | 1:0.0 | 1.677 | 2 | 2.1 | 99 | 499 | 722 | 849 | 956 |
| 12 | X | 210 | 72 | 1:0.3 | 1.486 | 2 | 1.8 | 149 | 848 | 1123 | 1402 | 1618 |
| 13 | X | 202 | 202 | 1:1.0 | 1.427 | 1¾ | 2.0 | 294 | 1950 | 3062 | 3541 | 3817 |
| 14 | X | 204 | 306 | 1:1.5 | 1.396 | 1¼ | 2.5 | 1104 | 3051 | 3938 | 4325 | 4809 |
| 15 | X | 206 | 412 | 1:2.0 | 1.370 | 1¾ | 2.5 | 1838 | 3915 | 4864 | 5262 | 5695 |
| 16 | X | 208 | 521 | 1:2.5 | 1.484 | 2 | 2.2 | 2144 | 4084 | 5258 | 5629 | 6284 |
| 17 | X | 213 | 638 | 1:3.0 | 1.565 | 2¾ | 2.1 | 2443 | 3921 | 5058 | 5601 | 5994 |
| 18 | Y | 200 | — | 1:0.0 | 1.590 | ¾ | 1.4 | 108 | 419 | 730 | 796 | 808 |
| 19 | Y | 202 | 202 | 1:1.0 | 1.383 | 1¾ | 2.0 | 742 | 2067 | 3139 | 3527 | 3791 |
| 20 | Y | 204 | 306 | 1:1.5 | 1.340 | 1¾ | 2.2 | 1525 | 3131 | 4023 | 4527 | 4686 |

TABLE VI-continued

| Concrete No. | Cement Source | Cement Lbs/yd³ | Fly Ash (A) lbs/yd³ | Ratio Cement:Fly Ash-by Wt. | w/c | Slump In. | Air % | Compressive strength - P.S.I. | | | | |
|---|---|---|---|---|---|---|---|---|---|---|---|---|
| | | | | | | | | 1-Day | 7-Day | 28-Day | 56-Day | 90-Day |
| 21 | Y | 206 | 412 | 1:2.0 | 1.413 | 1¾ | 2.3 | 1903 | 3658 | 4788 | 5411 | 5701 |
| 22 | Y | 208 | 515 | 1:2.5 | 1.455 | 1¾ | 2.3 | 2295 | 4055 | 5345 | 6158 | 6461 |
| 23 | Y | 213 | 638 | 1:3.0 | 1.537 | 1¾ | 2.3 | 2390 | 3882 | 5075 | 5862 | 6074 |

EXAMPLE 3

To illustrate the difference between the strength producing properties of several typical fly ashes covered by the scope of this invention and those outside the scope of this invention, eleven batches of concrete were fabricated having approximately 200 lbs. of cement X and 500 lbs. of fly ash per cubic yard of concrete. The test data are summarized in Table VII. The concretes containing fly ashes A through E, which are within the scope of this invention have significantly higher compressive strengths, at all ages of test, than those concretes containing fly ashes F through K and which are not within the scope of this invention. The magnitude of the 1-day compressive strengths of concretes No. 24 through 28 are of particular importance because of restrictions often imposed on the time for stripping the concrete forms; that is, the concretes must reach a certain strength early in order to permit stripping of forms. The somewhat lower 1-day compressive strengths of concretes No. 25 and 28 are attributable to the lower surface area of the fly ashes B and E. These two ashes have surface areas in the range of 2700 to 3250 cm²/gram as measured by the Blaine permeability apparatus (ASTM C204). Fly ashes A, C and D have surface areas in the range of 3600 to 6025 cm²/gram.

gated. Quartz ($SiO_2$), which is chemically inert, was ball milled to a Blaine surface area of approximately 3000 cm²/gram. The ground quartz was used as a substitute for fly ash in the test concretes to evaluate the influence of volume without introducing any kind of reactive material. Two different cements were used in the test series. Measurements were made of slump, air and compressive strength after 1, 7, 28 56 and 90 days as in previous Examples. From the test data generated, it was apparent that the added increments of the inert ground quartz did increase the effectiveness of the Portland cement in developing additional compressive strength, but the increases are relatively minor when compared to those produced when cement and those fly ashes within the scope of this invention are combined in the same weight ratios. See Table VII A.

EXAMPLE 5

The effect of combining another fly ash within the scope of this invention, fly ash D from Table I with Portland cement X in various weight ratios was examined. The test data are summarized in Table VIII. Concretes no. 45, 46 and 47 contain no cement and the moderate strengths of these concretes indicate that fly ash D has some cementitious characteristics of its own. Within each of the four subseries each of which con-

TABLE VII

| Concrete No. | Cement (X) lbs/yd³ | Fly Ash | | w/c | Slump in. | Air % | Compressive Strength - P.S.I. | | | | |
|---|---|---|---|---|---|---|---|---|---|---|---|
| | | Source | lbs/yd³ | | | | 1-Day | 7-Day | 28-Day | 56-Day | 90-Day |
| 24 | 204 | A | 510 | 1.369 | 1¼ | 2.5 | 2570 | 4647 | 5720 | 5912 | 6631 |
| 25 | 200 | B | 500 | 1.219 | 4¼ | 1.6 | 806 | 3496 | 5764 | 6846 | 7297 |
| 26 | 206 | C | 515 | 1.168 | 3¼ | 2.9 | 2471 | 3575 | 4908 | 5669 | 6270 |
| 27 | 202 | D | 505 | 1.251 | 2 | 2.5 | 2715 | 5063 | 5633 | 6218 | 6666 |
| 28 | 204 | E | 510 | 1.180 | 5¾ | 2.5 | 786 | 3291 | 4462 | 5023 | 5528 |
| 29 | 206 | F | 515 | 1.456 | 4¼ | 2.0 | 307 | 1242 | 2080 | 2570 | 3523 |
| 30 | 206 | G | 515 | 1.658 | 5¼ | 1.7 | 177 | 823 | 1387 | 1992 | 2897 |
| 31 | 204 | H | 510 | 1.267 | 2¾ | 2.1 | 241 | 1637 | 2363 | 3075 | 3945 |
| 32 | 202 | I | 505 | 1.236 | 2¾ | 2.0 | 300 | 1808 | 2943 | 3891 | 5278 |
| 33 | 202 | J | 505 | 1.265 | 3¼ | 1.9 | 265 | 1342 | 2071 | 2902 | 4023 |
| 34 | 202 | K | 505 | 1.295 | 3¼ | 2.0 | 310 | 1583 | 2577 | 3739 | 4855 |

EXAMPLE 4

The possibility that the high strengths obtained with the low-cement high fly ash concrete compositions of the invention are due to volume changes was investitains a fixed amount of cement, an increase in fly ash content results in a very significant increase in compressive strength at all ages of test.

TABLE VIIA

| Concrete No. | Cement Source | Lbs/yd³ | Ground Quartz Lbs/yd³ | Ratio of Cement:Quartz By wt. | w/c | Slump in. | Air % | Compressive Strength - P.S.I. | | | | |
|---|---|---|---|---|---|---|---|---|---|---|---|---|
| | | | | | | | | 1-Day | 7-Day | 28-Day | 56-Day | 90-Day |
| 35 | X | 202 | — | 1:0.0 | 1.677 | 1¼ | 2.0 | 80 | 360 | 520 | 670 | 717 |
| 36 | X | 208 | 208 | 1:1.0 | 1.512 | 2¼ | 2.1 | 165 | 632 | 880 | 1117 | 1154 |
| 37 | X | 217 | 435 | 1:2.0 | 1.463 | 2¼ | 2.1 | 223 | 736 | 1078 | 1248 | 1428 |
| 38 | X | 222 | 555 | 1:2.5 | 1.511 | 2¼ | 2.0 | 179 | 686 | 929 | 1071 | 1286 |
| 39 | X | 227 | 682 | 1:3.0 | 1.569 | 3 | 1.8 | 192 | 652 | 838 | 1023 | 1186 |
| 40 | Y | 202 | — | 1:0.0 | 1.707 | 2¼ | 2.1 | 65 | 455 | 600 | 633 | 603 |
| 41 | Y | 198 | 198 | 1:1.0 | 1.531 | 2¼ | 3.0 | 157 | 773 | 1063 | 1137 | 1200 |
| 42 | Y | 198 | 396 | 1:2.0 | 1.471 | 2¼ | 2.0 | 219 | 914 | 1249 | 1299 | 1324 |
| 43 | Y | 198 | 495 | 1:2.5 | 1.501 | 2¼ | 1.9 | 262 | 951 | 1339 | 1473 | 1485 |
| 44 | Y | 198 | 594 | 1:3.0 | 1.591 | 3 | 1.8 | 209 | 788 | 1160 | 1216 | 1238 |

Some of the data in Table VIII are repeated in Table IX for discussion purposes. Concretes No. 46, 51, 54 and 62 contain approximately 500 pounds of fly ash per cubic yard, but different amounts of cement. The increased strengths which result from the addition of various levels of cement may be expressed as percentages of the strength of concrete No. 46, which contains no cement, and as percentages of the next lower cement addition level, which gives a measure of the incremental benefit of extra cement. Addition of approximately 50 lbs/yd cement increases strengths, averaged over all ages of test, to 498% of the concrete containing no cement (comparing No. 51 to 46). Addition of a further 50 lbs. of cement to a total of 100 lbs/yd, increases average strengths to 565% of that of the cement containing no cement (comparing No. 54 to 46) and to 113% of the concrete containing approximately 50 lbs cement per cubic yard. Another increase in cement, of 100 lbs/yd, to a total of 200 lbs/yd, increases average strength to 731% of that of the concrete containing no cement (comparing No. 62 to 46) and to 129% of that of the concrete containing approximately 100 lbs cement per cubic yard. Thus each increment of 50 lbs of cement increases strength roughly 15 percent above the strength of the concrete containing the lower increment, except that the first added approximately 50 pounds increases strength 565 percent, converting the concrete from a concrete that is not strong enough to allow stripping in actual concrete practice until 28 days or later to one that offers no stripping problem after 24 hours.

TABLE VIII

| Concrete No. | Cement (X) lbs/yd³ | Fly Ash (D) lbs/yd³ | Cement to Fly Ash ratio:by wt. | w/c | Air % | Slump in | Compressive Strength - P.S.I. | | | | |
|---|---|---|---|---|---|---|---|---|---|---|---|
| | | | | | | | 1-Day | 7-Day | 28-Day | 56-Day | 90-Day |
| 45 | 0 | 245 | — | — | 1.5 | 2¼ | 138 | 528 | 820 | 961 | 1085 |
| 46 | 0 | 495 | | — | 1.5 | 4¼ | 379 | 599 | 781 | 837 | 1125 |
| 47 | 0 | 742 | | — | 2.4 | 2 | 1100 | 1735 | 2183 | 2429 | 2809 |
| 48 | 50 | 125 | 1:2.5 | 6.485 | 1.3 | 2¼ | 24 | 233 | 332 | 419 | 469 |
| 49 | 50 | 250 | 1:5.0 | 5.952 | 1.4 | 4 | 164 | 846 | 1394 | 1547 | 1689 |
| 50 | 49 | 371 | 1:7.5 | 5.288 | 2.1 | 3 | 813 | 2092 | 2738 | 3040 | 3377 |
| 51 | 49 | 495 | 1:10.0 | 4.867 | 2.5 | 2¼ | 1747 | 3195 | 3997 | 4618 | 4851 |
| 52 | 49 | 742 | 1:15.0 | 5.288 | 2.2 | 1¼ | 3064 | 4864 | 6116 | 6414 | 6653 |
| 53 | 100 | 250 | 1:2.5 | 2.795 | 1.9 | 2¼ | 358 | 1542 | 2221 | 2490 | 2796 |
| 54 | 99 | 495 | 1:5.0 | 2.644 | 2.1 | 3¼ | 2040 | 3749 | 4622 | 5012 | 5293 |
| 55 | 99 | 742 | 1:7.5 | 2.644 | 2.3 | 2¼ | 3514 | 5232 | 6133 | 6407 | 7106 |
| 56 | 100 | 1000 | 1:10.0 | 2.974 | 2.5 | 1¼ | 4022 | 5774 | 6029 | 6577 | 7584 |
| 57 | 151 | 151 | 1:1.0 | 2.002 | 1.6 | 1¾ | 184 | 945 | 1414 | 1599 | 1814 |
| 58 | 151 | 379 | 1:2.5 | 1.806 | 2.2 | 3 | 1094 | 2922 | 3743 | 4084 | 4421 |
| 59 | 150 | 600 | 1:4.0 | 1.744 | 2.4 | 1¾ | 3018 | 5105 | 5848 | 6417 | 6669 |
| 60 | 150 | 750 | 1:5.0 | 1.883 | 2.2 | 3 | 4110 | 6111 | 6704 | 7189 | 7449 |
| 61 | 200 | 400 | 1:2.0 | 1.382 | 2.2 | 3 | 2089 | 4072 | 5043 | 5392 | 5754 |
| 62 | 200 | 500 | 1:2.5 | 1.382 | 2.1 | 3 | 2661 | 5079 | 6023 | 6270 | 6605 |
| 63 | 202 | 758 | 1:3.75 | 1,457 | 2.3 | 2¼ | 4019 | 6011 | 6880 | 7266 | 7114 |
| 64 | 198 | 990 | 1:5.0 | 1,681 | 2.4 | 2¼ | 4616 | 6651 | 7057 | 7150 | 8006 |

TABLE IX

| Concrete No. | Cement (X) lbs/yd³ | Fly Ash (D) lbs/yd³ | Cement to Fly Ash Ratio: by wt | W/c | Air % | Slump In. | Compressive Strength PSI | | | | | Ave. Inc. In. PSI % |
|---|---|---|---|---|---|---|---|---|---|---|---|---|
| | | | | | | | 1-Day | 7-Day | 28-Day | 56-Day | 90-Day | |
| 46 | 0 | 495 | — | — | 1.5 | 4¼ | 379 | 599 | 781 | 837 | 1125 | |
| 51 | 49 | 495 | 1:10.0 | 4.867 | 2.5 | 2¼ | 1747 | 3195 | 3997 | 4618 | 4851 | |
| Increase in strength of Concrete No. 51 over No. 46 -% | | | | | | | 461 | 533 | 512 | 552 | 431 | 498 |
| 54 | 99 | 495 | 1:5.0 | 2,644 | 2.1 | 3¼ | 2040 | 3749 | 4622 | 5012 | 5293 | |
| Increase in strength of Concrete No. 54 over 46- % | | | | | | | 538 | 626 | 592 | 599 | 470 | 565 |
| Increase in strength of Concrete No. 54 over No. 51-% | | | | | | | 117 | 117 | 116 | 108 | 109 | 113 |
| 62 | 200 | 500 | 1:2.5 | 1.382 | 2.1 | 3 | 2661 | 5079 | 6023 | 6270 | 6605 | |
| Increase in strength of Concrete No. 62 over No. 54 -% | | | | | | | 130 | 135 | 130 | 125 | 125 | 129 |
| Increase in strength of Concrete No. 62 over No. 46 -% | | | | | | | 702 | 848 | 771 | 749 | 587 | 731 |

EXAMPLE 6

It is of interest to establish, in a general way, the magnitude of the various strength producing processes that are in play in the low cement-high fly ash content compositions embodied by the scope of this invention. If it is assumed that three basic chemical processes take place in the system, (1) the reaction between cement and water; (2) the reaction between fly ash and water; and (3) an "added reaction", then the strength contributed by each process can be estimated, using the data shown in Table X for concrete having approximately the same cementitious volume so as to eliminate volume as a minor factor. It is well known that the chemical reaction previously described as the "pozzolanic reaction" is a slow one because it depends on the rate at which cement reacts with water and liberates calcium hydroxide which in itself is a slow process. Since the magnitude of the strength contributed by the "added reaction" (Table X, Line 4) at 1, 7 and 28 days is much greater than that expected for such a reaction, a fourth chemical process must be occurring, a reaction that does not occur in conventional high cement-low fly ash content compositions.

TABLE X

| Line No. | Concrete No. | Cement (X) Lbs/yd³ | Fly Ash (D) Lbs/yd³ | Ground Quartz Lbs/yd³ | Compressive Strength PSI | | | | | Strength Producing Process |
|---|---|---|---|---|---|---|---|---|---|---|
| | | | | | 1-Day | 7-Day | 28-Day | 56-Day | 90-Day | |
| 1 | 38 | 222 | — | 555 | 179 | 686 | 929 | 1071 | 1286 | Reaction between cement and water |
| 2 | 62 | 200 | 500 | — | 2661 | 5079 | 6023 | 6270 | 6605 | Reaction between cement and water Reaction between fly ash and water Added reaction |
| 3 | 47 | 0 | 742 | — | 1100 | 1735 | 2183 | 2429 | 2809 | Reaction between fly ash and water |
| 4 | Line 2-(Line 1 & Line 3) | | | | 1382 | 2658 | 2911 | 2770 | 2510 | Added reaction |

EXAMPLE 7

Test concretes fabricated from three cements and four fly ashes that fall within the scope of this invention (A,B,C, and E) are described in Table XI. Weight ratios of cement to fly ash vary from a low of 1:1.0 (Concrete No. 80) to a high of 1:10.1 (Concrete No. 92). As is noted in Example 3, the concretes containing fly ashes B and E exhibit somewhat lower 1-day compressive strengths because of their lower surface areas, but rapidly gain strength between 1 and 7 days. The compressive strengths attained by Concrete No. 71 indicate that fly ash B (like D in Table VIII) has some cementitious properties in itself.

tion are described in Table XII. The compressive strength, at any given age of test, of Concrete No. 97 should be approximately the same as the average of the strengths of Concrete No. 26 and 27 listed in Table VII. This is not the case. The strength of Concrete No. 97, at every age of test, is significantly higher than the corresponding average strength of Concretes No. 26 and 27 (Table VII). Of the twenty strength values cited in Table XII 65% are significantly higher than the corresponding average calculated from the strength data in Table VII, 20% are essentially the same, and only 15% are lower. This indicates that in the majority of instances, blending two or more of the fly ashes covered by the scope of this patent prior to their use in concrete

TABLE XI

| Concrete No. | Cement Source | Cement Lbs/yd³ | Fly Ash Source | Fly Ash Lbs/yd³ | Cement to Fly Ash Ratio by Weight | W/C | % Air | Slump in. | Compressive Strength PSI | | | | |
|---|---|---|---|---|---|---|---|---|---|---|---|---|---|
| | | | | | | | | | 1-Day | 7-Day | 28-Day | 56-Day | 90-Day |
| 65 | X | 50 | A | 500 | 1:10.0 | 6.011 | 2.5 | ¾ | 891 | 1531 | 1664 | 1942 | 1980 |
| 66 | X | 101 | A | 404 | 1:4.0 | 2.620 | 2.5 | 1 | 1301 | 2568 | 3858 | 4250 | 4621 |
| 67 | X | 101 | A | 758 | 1:7.5 | 3.358 | 2.3 | 2¼ | 1847 | 2365 | 2807 | 3167 | 3800 |
| 68 | X | 134 | A | 310 | 1:2.3 | 2.121 | 2.1 | 2¼ | 1377 | 2798 | 3872 | 4282 | 4453 |
| 69 | X | 153 | A | 357 | 1:2.3 | 1.865 | 2.2 | 2 | 1239 | 2688 | 3939 | 4465 | 4886 |
| 70 | X | 412 | A | 1031 | 1:2.5 | 1.184 | 1.4 | 7¼ | 2897 | 4795 | 5785 | 6111 | 6880 |
| 71 | X | 0 | B | 495 | — | — | 1.3 | 6 | 237 | 884 | 1536 | 2317 | 2859 |
| 72 | X | 48 | B | 347 | 1:7.2 | 4.944 | 1.4 | 4 | 315 | 1416 | 2637 | 3652 | 4318 |
| 73 | X | 49 | B | 490 | 1:10.0 | 5.103 | 1.4 | 5¼ | 241 | 1056 | 1651 | 2090 | 2791 |
| 74 | X | 98 | B | 735 | 1:7.5 | 2.671 | 1.7 | 4½ | 640 | 2451 | 3673 | 4456 | 5419 |
| 75 | X | 100 | B | 400 | 1:4.0 | 2.617 | 1.1 | 6 | 267 | 1179 | 1942 | 2535 | 3395 |
| 76 | X | 134 | B | 310 | 1:2.3 | 1.916 | 1.4 | 3¾ | 546 | 2385 | 3747 | 5074 | 5484 |
| 77 | X | 150 | B | 350 | 1:2.3 | 1.744 | 1.2 | 6 | 316 | 1506 | 2293 | 3209 | 4397 |
| 78 | X | 104 | B | 234 | 1:2.2 | 1.255 | 1.7 | 2¾ | 461 | 2121 | 3301 | 4451 | 5055 |
| 79 | X | 392 | B | 980 | 1:2.5 | 0.942 | 0.4 | 11 | 1039 | 4029 | 6577 | 7183 | 8547 |
| 80 | Y | 200 | B | 200 | 1:1.0 | 1.338 | 1.5 | 2¼ | 418 | 1439 | 2877 | 3543 | 4133 |
| 81 | Y | 200 | B | 300 | 1:1.5 | 1.278 | 1.5 | 3¾ | 572 | 1999 | 4015 | 5122 | 5593 |
| 82 | Y | 204 | B | 408 | 1:2.0 | 1.136 | 1.9 | 2¼ | 794 | 2905 | 5415 | 6174 | 6537 |
| 83 | Y | 204 | B | 510 | 1:2.5 | 1.165 | 1.9 | 2¼ | 953 | 3088 | 5732 | 6432 | 6963 |
| 84 | X | 50 | C | 500 | 1:10.0 | 4.583 | 3.0 | 2 | 492 | 820 | 987 | 1050 | 1225 |
| 85 | X | 99 | C | 742 | 1:7.5 | 2.766 | 2.0 | 5¼ | 1031 | 1786 | 2505 | 2747 | 3012 |
| 86 | X | 101 | C | 303 | 1:3.0 | 2.532 | 2.4 | 2 | 890 | 1734 | 2539 | 3022 | 3288 |
| 87 | X | 102 | | 408 | 1:4.0 | 2.215 | 2.4 | 2 | 1747 | 2411 | 2874 | 3897 | 4492 |
| 88 | X | 101 | C | 505 | 1:5.0 | 2.296 | 2.4 | 3¼ | 1056 | 2628 | 3639 | 4368 | 4747 |
| 89 | X | 133 | C | 333 | 1:2.5 | 1.782 | 2.3 | 2¾ | 1806 | 3115 | 4158 | 4796 | 4947 |
| 90 | X | 151 | C | 353 | 1:2.3 | 1.582 | 2.3 | 2¼ | 2027 | 3027 | 4072 | 4888 | 5302 |
| 91 | Z | 202 | C | 505 | 1:2.5 | 1.217 | 3.0 | 3 | 2383 | 4586 | 5688 | 6395 | 6500 |
| 92 | X | 49 | E | 495 | 1:10.1 | 4.807 | 2.5 | 3¼ | 98 | 1064 | 1516 | 1693 | 1854 |
| 93 | X | 101 | E | 303 | 1:3.0 | 2.483 | 2.2 | 1¾ | 115 | 824 | 1596 | 1944 | 2089 |
| 94 | X | 101 | E | 404 | 1:4.0 | 2.444 | 1.8 | 3 | 204 | 1423 | 2337 | 2684 | 2863 |
| 95 | X | 99 | E | 495 | 1:5.0 | 2.524 | 1.7 | 6¼ | 156 | 1626 | 2445 | 2815 | 2987 |
| 96 | X | 153 | E | 357 | 1:2.3 | 1.612 | 2.3 | 2 | 279 | 1615 | 2632 | 3394 | 3538 |

EXAMPLE 8

Concretes fabricated from Portland cement and four blends of five fly ashes within the scope of this invention will lead to a synergistic increase in compressive strength.

TABLE XII

| Concrete No. | Cement (X) Lbs/yd³ | Fly Ash Source | Fly Ash Lbs/yd³ | w/c | Slump in. | Air % | Compressive Strength PSI 1-Day | 7-Day | 28-Day | 56-Day | 90-Day |
|---|---|---|---|---|---|---|---|---|---|---|---|
| 97 | 202 | C | 252 | 1.206 | 2¼ | 2.4 | 3450 | 5130 | 6052 | 6726 | 6851 |
|  |  | D | 252 |  |  |  |  |  |  |  |  |
| 98 | 202 | B | 252 | 1.280 | 2¼ | 2.4 | 1293 | 4590 | 6085 | 6520 | 6724 |
|  |  | D | 252 |  |  |  |  |  |  |  |  |
| 99 | 200 | A | 250 | 1.352 | 2¼ | 2.2 | 2775 | 4908 | 5901 | 6367 | 6748 |
|  |  | D | 250 |  |  |  |  |  |  |  |  |
| 100 | 200 | E | 250 | 1.278 | 3 | 2.2 | 1354 | 4448 | 5728 | 6167 | 6670 |
|  |  | D | 250 |  |  |  |  |  |  |  |  |

EXAMPLE 9

The strength producing properties of the low cement-high fly ash compositions of this invention are also observed when they are used in mortar. A description of the test mortars and their respective compressive strengths, at three ages of test, are listed in Table XIII. All of the test mortars contained 200 grams of cement, 500 grams of fly ash, 2052 grams of sand and 370 grams of water. The sand used in the mortars was natural silica sand, as described in ASTM C109, Section 4.1.1. The mortars were cast into 2"×2"×2" cube molds after mixing. The compressive strengths of the mortars containing the fly ashes within the scope of this invention (Mortars No. 1, 2, 3, 7, 8, 12, 13 and 14) are significantly higher, at all ages of test, than those containing the fly ashes outside the scope of this invention.

TABLE XIII

| Mortar No. | Cement Source | Fly Ash Source | Compressive Strength - PSI 3-Days | 7-Days | 28-Days |
|---|---|---|---|---|---|
| 1 | X | A | 2000 | 3200 | 4600 |
| 2 | X | B | 850 | 1700 | 2900 |
| 3 | X | C | 1820 | 2800 | 4300 |
| 4 | X | F | 280 | 550 | 700 |
| 5 | X | G | 290 | 450 | 700 |
| 6 | X | I | 465 | 750 | 1250 |
| 7 | Y | D | 1660 | 2400 | 2950 |
| 8 | Y | E | 590 | 1300 | 2250 |
| 9 | Y | H | 300 | 550 | 700 |
| 10 | Y | J | 295 | 475 | 875 |
| 11 | Y | K | 310 | 540 | 900 |
| 12 | Z | D | 1810 | 2850 | 4425 |
| 13 | Z | E | 1345 | 2100 | 3685 |
| 14 | Z | A | 2500 | 2850 | 4510 |
| 15 | Z | H | 215 | 550 | 1100 |
| 16 | Z | J | 270 | 550 | 1150 |
| 17 | Z | K | 265 | 600 | 1260 |

EXAMPLE 10

The magnitude of the compressive strengths gained by the low cement-high fly ash mixtures of this invention is further dramatized when they are combined with water (no aggregate) to fabricate pastes. A description of six typical pastes, along with their compressive strengths at three ages of test, are summarized in Table XIV. Each paste was cast into 2"×2"×2" molds immediately after fabrication and moist cured until tested for compressive strength. The compressive strengths of the pastes made from two fly ashes whose composition is outside the scope of this invention. (Pastes No. P-3 and P-6) are significantly lower than those of the other pastes at all ages of test.

TABLE XIV

| Paste No. | Cement(Y) Grams | Fly Ash Source | Fly Ash Grams | Ratio of Cement to Fly Ash-by wt. | Water Grams | w/c | Compressive Strength - PSI 3-Days | 7 Days | 28-Days |
|---|---|---|---|---|---|---|---|---|---|
| P-1 | 400 | B | 1200 | 1:3.0 | 350 | 0.875 | 5550 | 9050 | 10950 |
| P-2 | 400 | C | 1200 | 1:3.0 | 350 | 0.875 | 2900 | 3150 | 8625 |
| P-3 | 400 | I | 1200 | 1:3.0 | 390 | 0.975 | 1900 | 2400 | 4200 |
| P-4 | 300 | B | 1200 | 1:4.0 | 350 | 1.167 | 4050 | 6100 | 9600 |
| P-5 | 400 | A | 1200 | 1:3.0 | 410 | 1.025 | 4800 | 5650 | 8950 |
| P-6 | 400 | K | 1200 | 1:3.0 | 400 | 1.000 | 1700 | 2300 | 3350 |

EXAMPLE 11

Concrete fabricated from the low cement-high fly ash mixtures within the scope of this invention responds in an unusual, and to some extent unpredictable, way to the chemical admixtures commonly used in non-fly ash concrete and/or conventional fly ash concretes containing low amounts of fly ash. In a number of experiments, conventional set accelerating agents for Portland cement concretes including calcium chloride, calcium formate and triethanolamine, were added to concretes of this invention containing fly ashes A, B, C and D in greater than 1 to 2, cement to fly ash, ratios. Calcium chloride when added to a mixture of cement X and fly ash A (1 to 2.5 ratio) at its typical rate of 2% (1) based upon the cement, (2) based upon the fly ash, and (3) based upon cement plus fly ash, surprisingly was found to either retard or have no effect upon the initial setting time of the concretes. In similar experiments, calcium formate was found surprisingly to act as a retarder, that is the initial setting times of the concretes were delayed. At addition rates of 0.04 and 0.06 percent on the weight of cement and fly ash, triethanolamine had very little effect on the setting time of concretes within the scope of this invention containing cement "X" and fly ash "A" in a 1 to 2.5 ratio. When the addition rates were increased to 0.08 and 0.20 percent in concretes of the invention prepared using cement "X" and fly ash "B" (1 to 2.5 ratio), the setting times were actually significantly delayed, a result quite the opposite to that to be expected. The effect of the three chemical admixtures (calcium chloride, calcium formate and triethanolamine) on the compressive strengths of the test concretes was in the majority of cases, a positive one. For example, of 30 compressive strength-values measured for the concretes treated with a chemical admixture, 23 or approximately 77%, are higher than the strengths of the reference, non-admixed concretes at three ages of test (1, 7 and 28 days). For the sake of brevity, the detailed data is not given herein.

EXAMPLE 12

The effect of adding calcium chloride (and calcium formate) on the setting time of the low cement-high fly ash compositions of the invention was further investigated using a modification of the ASTM C403 method. In the ASTM C403 procedure, the coarse aggregate is removed from the test concrete by screening prior to setting time measurement. In the modified C403 method, mortar having a composition similar to that of the C403 screened mortar is fabricated and its setting time determined by the standard penetration technique. The effect of calcium chloride and calcium formate on the setting time of cement "Y" and fly ash "D", 1:2.5 weight ratio mixtures was found to be essentially the same as that reported in Example 11 for 1:2.5 weight ratio mixtures of cement "X" fly ash "A" and "B". The same can be said for the 1:2.5 as well as the 1:2.0; 1:3.0 and 1:4.0 weight ratio mixtures of cement "Y" and fly ash "C" when treated with calcium chloride. However, all four of the combinations of cement "Y" and fly ash "B" that were tested exhibit a dramatic acceleration in initial setting time when admixed with calcium chloride, which illustrates the unpredictability of the response of the low cement-high fly ash compositions of the invention to the set accelerating admixtures commonly used with non-fly ash concretes and/or conventional fly ash concrete. Again, for the sake of brevity, the detailed data is not given herein.

EXAMPLE 13

A set retarding admixture is a chemical additive for concrete, mortar or paste that reduces the rate of hardening or setting, thus increasing the time required to reach initial and final set. Three set retarding admixtures commonly used with non-fly ash concrete and/or conventional fly ash concrete are (1) salts of lignosulfonic acid, (2) salts of hydroxylated carboxylic acids such as gluconic acid and heptogluconic acid and (3) carbohydrates, usually in the form of high molecular weight glucose polymers such as corn syrup. In order to obtain approximately two hours set retardation at room temperature, the first is conventionally added at the rate of about 0.25% and the second and third at the rate at about 0.06% on the weight of cement in the concrete. The results of adding representatives of these three chemical admixtures to low cement-high fly ash concretes of the invention were investigated. The setting times were measured in accordance with the ASTM C403 procedure and the weight ratio of cement to fly ash in all of the mixtures was 1:2.5. When the three admixtures are added at a rate comparable to that used in conventional concrete, i.e., the rate is based on the weight of cement, the setting time is either unaltered or accelerated. When the addition rate is based on the weight of fly ash or the weight of cement plus fly ash, the initial set is retarded. For example, an addition rate of 0.25% based on the total weight of cement and fly ash represents 0.875% calcium lignosulfonate on weight of cement only. If the admixture is delaying the hydration of the cement only and if the initial set is due to the cement, as it is in conventional concrete, then the delay in initial set would be on the order of 18 to 24 hours. This is another strong indication that some process is at work in the low cement-high fly ash system of the invention that cannot be explained by existing technology. Again, for the sake of brevity, the detailed data is not given herein.

EXAMPLE 14

In this example, the effect of common set retarding admixtures on the initial setting time of the low cement-high fly ash mixtures of the invention was further investigated using the modified ASTM C403 method. When mixtures of cement "Y" and fly ash "B" having weight ratios of 1:2.0; 1:2.5; 1:3.0 and 1:4.0 are tested with the three retarders of Example 13 at the normal rate but based on the total weight of cement and fly ash, the initial set is retarded and the degree of retardation is greater than that reported in Example 13 for mixtures of cement "X" and fly ash "A" and "B". However, when mixtures of cement "Y" and fly ash "C", in weight ratios of 1:2.0; 1:2.5; 1:3.0 and 1:4.0, are treated with sodium gluconate at the same addition rate based on the weight of cement and fly ash, the initial set is accelerated. This is an unexpected phenomenon which demonstrates a novel chemistry in connection with the low cement-high fly ash systems of the invention. Again, for the sake of brevity, the detailed data is not given herein.

EXAMPLE 15

In this Example, a fly ash having a composition outside of those within the invention (Table II) was blended with various chemical compounds in an attempt to bring its overall composition within that of Table II. In one experiment, approximately 35 lbs. of calcium sulfate, 18 lbs. of magnesium oxide and 115 lbs. of calcium hydroxide were thoroughly blended with 350 lbs. of fly ash G (Blend #1). A second blend was made from approximately 35 lbs. of sodium sulfate, 131 lbs. of calcium hydroxide, 17 lbs. of magnesium oxide and 327 lbs. of fly ash G (Blend #2). Both blends were then evaluated in concrete having a cement to blend ratio of 1:2.5 by weight. The composition of the two blends is listed in Table XV and the concrete data are summarized in Table XVI. The data in Table XVI clearly indicates that the composition range covered by the scope of this patent must be produced within the ash itself during the burning of the coal and that such composition cannot be synthesized by simple blending of chemical ingredients in order to get the exceptionally high compressive strength. In Table XVI, the strengths of the blends were improved by the attempt at synthesization, but were not as great as is obtained with compositions of the invention.

TABLE XV

| | Composition of Blends | |
|---|---|---|
| | #1 | #2 |
| % $SiO_2$ | 35.3 | 33.5 |
| $Al_2O_3$ | 20.9 | 19.9 |
| $Fe_2O_3$ | 5.6 | 5.3 |
| % $SiO_2$ + $Al_2O_3$ + $Fe_2O_3$ | 61.8 | 58.7 |
| CaO | 22.9 | 22.6 |
| MgO | 3.9 | 3.8 |
| $SO_3$ | 4.2 | 4.1 |

TABLE XVI

| Concrete No. | Cement Source | Cement lbs/yd³ | Fly Ash Source | Fly Ash lbs/yd³ | w/c | Slump In. | Air % | Compressive Strength PSI 1-Day | 7-Day | 28-Day | 56-Day | 90-Day |
|---|---|---|---|---|---|---|---|---|---|---|---|---|
| 123 | X | 200 | G | 500 | 1.620 | 3 | 2.1 | 262 | 871 | 1511 | 2022 | 3010 |
| 124 | X | 200 | Blend 1 | 500 | 1.873 | 4 | 1.7 | 173 | 597 | 1744 | 2687 | 3674 |
| 125 | Y | 196 | G | 490 | 1.683 | 4 | 1.7 | 201 | 869 | 1627 | 2520 | NM* |
| 126 | Y | 200 | Blend 2 | 500 | 1.814 | 4¼ | 2.0 | 326 | 873 | 2010 | 2841 | NM |

*Not measured

EXAMPLE 16

A blend of two or more fly ashes which in combination has a composition that falls within Table II also produces concrete of unusually high compressive strength when combined with relatively small amounts of Portland cement. For example, fly ash "D" and fly ash "G" were thoroughly blended in a weight ratio of 3 parts "D" and 1 part "G" and the blend was evaluated in concrete. Concretes containing only fly ash "D" and only fly ash "G" were used as reference mixes. Cement "Y" was used in all three test concretes and the cement to fly ash weight ratio was 1:2.5. The test data are summarized in Table XVII. If one calculates weighted averages of Concrete Nos. 127 and 129 and compares these with No. 128, the combination produces greater strength than expected from the weighted averages for strengths obtained after 7 days, particularly after 90 days.

TABLE XVII

| Concrete No. | Cement(a) lbs/yd³ | Fly Ash Source | Fly Ash lbs/yd³ | w/c | Slump In. | Air % | Compressive Strength PSI 1-Day | 7-Day | 28-Day | 56-Day | 90-Day |
|---|---|---|---|---|---|---|---|---|---|---|---|
| 127 | 200 | D | 500 | 1.264 | 2¼ | 1.9 | 3342 | 6139 | 6959 | 7519 | 7836 |
| 128 | 198 | D | 371 | | | | | | | | |
| | | G | 124 | 1.381 | 3 | 1.7 | 2219 | 4556 | 5763 | 6593 | 7130 |
| 129 | 198 | G | 495 | 1.652 | 4 | 1.4 | 306 | 1018 | 1740 | 2231 | 2959 |

(a)Cement-Brand Y

EXAMPLE 17

In this Example, the dimensional stability of the low cement-high fly ash compositions of the invention were tested when subjected to autoclave curing conditions. Several cement/fly ash/water pastes were prepared and tested for their autoclave soundness in accordance with the method described in ASTM C151. The soundness requirement for Portland cement (ASTM C150) allows a maximum expansion of 0.80% when tested in accordance with ASTM C151. None of the pastes tested exceeded this limit; in fact, two of the pastes exhibited some shrinkage. For the sake of brevity, the detailed data is not given herein.

EXAMPLE 18

A series of eight ASTM C109 mortars was prepared in an effort to better understand the cause of the unexpectedly high compressive strengths developed by the low cement-high fly ash systems of the invention. Descriptions of the mortars along with the 7-day compressive strength developed by each are summarized in Table XVIII. Powdered silica, $SiO_2$, which is chemically inert, was added to six of the test mortars so as to maintain a reasonable constant volume of mortar throughout the series. In Mortar No. 18, the 300 grams of cement generated 5200 P.S.I. (at 7 days) or 17.3 P.S.I./gram of cement (5200 P.S.I.÷300 g.). If this latter value can be assigned to Mortar No. 19, the cement in the mortar should have contributed 1491 P.S.I. (86 g. cement×17.3 P.S.I./gram). The difference between the measured strength of 3250 P.S.I. and the 1491 P.S.I., or 1759 P.S.I., must have been produced by a reaction of the fly ash. The strength produced by Mortar No. 21, which contained an amount of $Ca(OH)_2$ equivalent to that which would be produced if the cement in Mortar No. 19 were to completely hydrate is strictly due to the pozzolanic reaction i.e., the reaction between the calcium hydroxide and the fly ash. Substracting the 450 P.S.I. generated by this reaction from the 1759 P.S.I. leaves 1309 P.S.I. unaccounted for and can only be attributed to some other interaction between the fly ash and the cement. The amount of synthetic tricalcium silicate ($C_3S$) employed in Mortar No. 20 is equivalent to that added to Mortar 19 by way of the cement. The fact that the strengths produced by Mortars No. 19 and 20 are essentially identical, indicates that the other components of Portland cement are not important to the 7-day compressive strengths of the low cement-high fly ash system of the invention. Mortar No. 22 is a duplicate of No. 20 and No. 25 is a duplicate of No. 21, but prepared in a different day. There is excellent agreement in the measured 7-day compressive strengths. The close similarity in the strengths of Mortars No. 23 and 24 indicates that the added calcium hydroxide (in No. 24) does very little to enhance the strength and that the $C_3S$-fly ash combination is the principal contributor to strength at 7-days.

TABLE XVIII

| | Mortar No. | | | | | | | |
|---|---|---|---|---|---|---|---|---|
| | 18 | 19 | 20 | 21 | 22 | 23 | 24 | 25 |
| Cement-Grams | 300 | 86 | — | — | — | — | — | — |
| Fly Ash C-Grams | — | 214 | 214 | 214 | 214 | 214 | 214 | 214 |
| ASTM C109 Sand - Grams | 825 | 825 | 825 | 825 | 825 | 825 | 825 | 825 |
| Water - Grams | 145 | 145 | 145 | 145 | 145 | 145 | 145 | 145 |
| $C_3S$ - Grams | — | — | 51 | — | 51 | 40 | 40 | — |
| $Ca(OH)_2$ - Grams | — | — | — | 25 | — | — | 9 | 25 |
| Powdered $SiO_2$ (inert - Grams) | — | — | 35 | 61 | 35 | 44 | 35 | 61 |
| 7-Day Compressive Strength - PSI | 5200 | 3250 | 3100 | 450 | 3050 | 2550 | 2600 | 500 |

EXAMPLE 19

In this Example, a low-density, lightweight porous mass having utility e.g. as a thermal insulating protective coating was prepared having the following composition:

|  | Grams |
| --- | --- |
| Portland cement | 171 |
| Fly Ash "D" | 429 |
| Expanded perlite | 400 |
| Water | 1025 |

A small amount of alpha olefin sulfonate surfactant as described in U.S. Pat. No. 3,926,650 was added to entrain air and give a hydrated mass having a density of 30.6 pounds per cubic ft. The expanded perlite used had a bulk density of approximately 6 pounds per cubic foot.

A similar composition substituting expanded vermiculite for perlite could be prepared from 6 cubic feet of expanded vermiculite (7 pounds p.c.f. density), 47 pounds of Portland cement, 117 pounds of fly ash, water and air-entraining, surface active agent. Such lightweight mixtures produce valuable low density, thermal insulating mixtures for use, inter alia, in roofs, etc. In such cases, sufficient surfactant is used to give a homogenous, non-segrated mixture and the desired density, typically less than about 40 pounds per cubic foot. A typical addition rate for the surface active agent is approximately 0.10 percent by weight of the cement and fly ash.

While the invention has been described herein using cements particularly characterized by the art as Portland cements as the reactive components with the high proportions of select fly ash according to the invention, it will be obvious to one skilled in the art that any cement similar to Portland having a significant amount of tricalcium silicate ($3CaO \cdot SiO_2$) and hydratable with water can likewise be employed in the compositions of the invention, and all such similar cements are intended to be included within the term "Portland cement" as used herein and in the following claims.

It is claimed:

1. A dry, hydratable concrete composition comprising a mixture of Portland cement and fly ash, and, in addition, aggregate in particulate form, said Portland cement and fly ash being present in a weight ratio of from 1 part cement to at least 1 part ash, said aggregate being present in an amount of at least 50 percent by volume of the total volume of the composition, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash furthe not having been first treated to promote activity prior to incorporation in said concrete composition.

2. The concrete composition of claim 1 wherein said ratio of cement to fly ash is from 1 part cement to at least 1.5 parts fly ash.

3. The concrete composition of claim 2 wherein said ratio is from 1 part cement to at least 2 parts fly ash.

4. The concrete composition of claim 1 wherein said aggregate has a dry bulk density greater than about 80 pounds per cubic foot.

5. The concrete composition of claim 1 wherein said aggregate comprises a mixture of coarse and fine aggregate, said fine aggregate having a particle size less than about ⅜ inch.

6. The concrete composition of claim 1 wherein said aggregate comprises a mixture of sand and stone and is present in an amount greater than about 50 percent by volume of the total composition.

7. The concrete composition of claim 1 to which is additionally added sufficient water to render the dry mixture plastic.

8. A dense, hard, hydrated concrete mass produced by addition of water to the dry mixture of claim 1 and thereafter allowing the resulting wet mixture to harden, said mass having a dry density greater than about 120 pounds per cubic foot.

9. A hydrated structural concrete mass having a density greater than about 70 pounds per cubic foot produced from the addition of water to a mixture comprised of Portland cement, fly ash and particulate aggregate having a density greater than about 40 pounds per cubic foot, said aggregate being present in an amount greater than about 50 percent by volume of the total volume of the hydrated mass, said cement and said fly ash being present in a weight ratio of from 1 part cement to at least about 1 part fly ash, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to incorporation in said mixture.

10. The concrete of claim 9 having a compressive strength in excess of 2000 P.S.I. measured after 28 days of addition of water.

11. The composition of claim 1 wherein said fly ash exhibits the following chemical analysis:

| Components | Approximate % by Weight |
| --- | --- |
| $SiO_2$ | 24.1–43.1 |
| $Al_2O_3$ | 14.3–27.5 |
| $Fe_2O_3$ | 4.2–9.5 |
| $SiO_2 + Al_2O_3 + Fe_2O_3$ | 47.9–72.4 |
| CaO | 16.8–29.6 |
| MgO | 3.7–8.5 |
| $SO_3$ | 1.6–6.4 |

12. The concrete composition of claim 1 wherein said aggregate is selected from the group consisting of gravel, granite, limestone, shale, silica sand, and mixtures thereof.

13. The concrete composition of claim 1 wherein said aggregate has a dry bulk density of less than about 15 pounds per cubic foot.

14. The concrete composition of claim 1 wherein said calcium oxide content is greater than about 15 percent by weight, and said total additive amount of $Si_2O$, $Al_2O_3$ and $Fe_2O_3$ is less than about 75 percent.

15. A dry, hydratable concrete composition comprising a mixture of Portland cement and fly ash, and, in addition, lightweight aggregate in particulate form, said Portland cement and fly ash being present in a weight ratio of from 1 part cement to at least 1 part ash, said aggregate having a dry bulk density of less than about 15 pounds per cubic foot and being present in an amount of at least 50 percent by volume of the total volume of the composition, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to incorporation in said concrete composition.

16. The concrete of claim 15 wherein said ratio of cement to fly ash is from 1 part cement to at least 1.5 parts fly ash.

17. Concrete composition of claim 15 wherein said lightweight aggregate is selected from the group consisting of expanded vermiculite, expanded perlite, cellular synthetic resin particles, cellular glass, and mixtures thereof.

18. The concrete composition of claim 15 additionally containing a small amount of air-entraining surface active agent.

19. The concrete composition of claim 15 to which is additionally added sufficient water to render the dry mixture plastic.

20. The composition of claim 15 wherein said fly ash exhibits the following chemical analysis:

| Components | Approximate % by Weight |
| --- | --- |
| $SiO_2$ | 24.1–43.1 |
| $Al_2O_3$ | 14.3–27.5 |
| $Fe_2O_3$ | 4.2–9.5 |
| $SiO_2 + Al_2O_3 + Fe_2O_3$ | 47.9–72.4 |
| CaO | 16.8–29.6 |
| MgO | 3.7–8.5 |
| $SO_3$ | 1.6–6.4 |

21. A lightweight concrete mass produced by addition of water to the dry mixture of claim 15 and thereafter allowing the resulting wet mixture to harden, said mass having a dry density of less than about 70 pounds per cubic foot.

22. A hydrated lightweight porous concrete mass having a density less than about 70 pounds per cubic foot, produced from the addition of water to a mixture comprised of Portland cement, fly ash and particulate aggregate having a density of less than about 15 pounds per cubic foot, said aggregate being present in an amount greater than about 50 percent by volume of the total volume of the hydrated mass, said cement and said fly ash being present in a weight ratio of from 1 part cement to at least about 1 part fly ash, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to incorporation in said mixture.

23. The hydrated porous mass of claim 21 additionally containing an air-entraining surface active agent.

24. The hydrated porous mass of claim 23 wherein said surface active agent is an alpha olefin sulfonate.

25. The hydrated porous mass of claim 22 having a density in the range of about 20 to 40 pounds per cubic foot.

26. The hydrated porous mass of claim 22 having a density in the range of about 10 to 25 pounds per cubic foot.

27. The hydrated porous mass of claim 22 additionallly having an air-entraining, surface active agent therein which is a sulfonate.

28. A dry, hydratable structural concrete composition capable upon admixture with water of hardening into a solid mass having a density greater than 70 pounds per cubic foot, said composition comprising a mixture of Portland cement and fly ash, and, in addition, aggregate in particulate form, said Portland cement and fly ash being present in a weight ratio of from 1 part cement to at least 1 part ash, said aggregate having a dry bulk density greater than about 80 pounds per cubic foot and being comprised of a mixture of a coarse aggregate having a particulate size greater than about ⅜ of an inch and a fine aggregate having a particulate size less than about ⅜ of an inch, said aggregate being present in an amount of at least 50 percent by volume of the total volume of the composition, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said fly ash further not having been first treated to promote activity prior to incorporation in said concrete composition.

29. The composition of claim 28 wherein said aggregate comprises a mixture of sand and crushed stone.

30. A dry hydratable lightweight concrete composition capable upon admixture with water of hardening into a solid mass having a density less than about 70 pounds per cubic foot, said composition comprising a mixture of Portland, fly ash, surface active agent and lightweight particulate aggregate having a density less than about 15 pounds per cubic foot, said cement and said fly ash being present in a weight ratio of from 1 part cement to at least about 1 part fly ash, said fly ash upon analysis having a total calcium oxide content greater than about 10 percent by weight, the total additive amount of $SiO_2$, $Al_2O_3$ and $Fe_2O_3$ present in said fly ash being less than about 80 percent by weight, said surface active agent being present in the composition in an amount sufficient to entrain air in the composition upon admixture with water, said fly ash further not having been first treated to promote activity prior to incorporation in said concrete composition.

31. The composition of claim 30 wherein said lightweight aggregate comprises expanded vermiculite.

32. The composition of claim 30 wherein the lightweight aggregate comprises expanded perlite.

* * * * *